US007479321B2

(12) United States Patent
Finn

(10) Patent No.: US 7,479,321 B2
(45) Date of Patent: Jan. 20, 2009

(54) FUSER MEMBER HAVING HIGH GLOSS COATING LAYER

(75) Inventor: Patrick J. Finn, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 443 days.

(21) Appl. No.: 11/139,891

(22) Filed: May 27, 2005

(65) Prior Publication Data

US 2006/0269736 A1 Nov. 30, 2006

(51) Int. Cl.

| | |
|---|---|
| ***B32B 25/02*** | (2006.01) |
| ***B32B 25/14*** | (2006.01) |
| ***B32B 27/20*** | (2006.01) |
| ***G03G 15/20*** | (2006.01) |

(52) U.S. Cl. ....................... 428/325; 428/328; 428/421; 399/333

(58) Field of Classification Search ................. 399/333; 428/323, 328, 329, 331, 421

See application file for complete search history.

(56) References Cited

U.S. PATENT DOCUMENTS

| | | | |
|---|---|---|---|
| 5,217,837 A | 6/1993 | Henry et al. | |
| 5,219,612 A | 6/1993 | Bingham et al. | |
| 5,332,641 A | 7/1994 | Finn et al. | |
| 5,595,823 A | 1/1997 | Chen et al. | |
| 5,763,129 A * | 6/1998 | Chen et al. | 430/124.31 |
| 5,998,033 A | 12/1999 | Tan et al. | |
| 6,011,946 A | 1/2000 | Eddy et al. | |
| 6,096,429 A | 8/2000 | Chen et al. | |
| 6,218,014 B1 | 4/2001 | Pickering et al. | |
| 6,582,871 B2 | 6/2003 | Pickering | |
| 6,829,466 B2 | 12/2004 | Finn et al. | |
| 6,838,140 B1 | 1/2005 | Heeks et al. | |
| 2003/0049056 A1 | 3/2003 | Finn et al. | |
| 2003/0207078 A1 | 11/2003 | Finn et al. | |
| 2004/0023144 A1 | 2/2004 | Pickering et al. | |
| 2004/0109055 A1 | 6/2004 | Pan et al. | |
| 2004/0109057 A1 | 6/2004 | Pan et al. | |
| 2006/0175002 A1* | 8/2006 | Mobley et al. | 156/244.13 |

FOREIGN PATENT DOCUMENTS

JP 2000147928 A * 5/2000

OTHER PUBLICATIONS

Machine translation of JP 2000-147928 A, May 2000.*
English language translation of JP 12-147928, May 2000.*

* cited by examiner

*Primary Examiner*—Ramsey Zacharia
(74) *Attorney, Agent, or Firm*—Eugene O. Palazzo and Fay Sharpe LLP

(57) ABSTRACT

A fuser component useful in electrostatographic machines is provided. The fuser component has a substrate, and thereover a coating composition comprising a haloelastomer, such as, for example, a fluoroelastomer, and a filler having a particle size of less than about 3 micrometers and a particle hardness of greater than 3 on the Mohs' hardness scale.

6 Claims, 2 Drawing Sheets

FUSER MEMBER HAVING HIGH GLOSS COATING LAYER

BACKGROUND

The present disclosure relates, in various embodiments, to an imaging member or apparatus and fuser components thereof. In particular, the present disclosure relates to a fuser member that includes a high gloss coating layer comprising a haloelastomer and filler particles of a certain size and hardness. A fuser member in accordance with the present disclosure is suitable for use in electrostatographic and xerographic printing processes and is described with particular reference thereto. It is to be appreciated by persons skilled in the art that fusers in accordance with the present disclosure are amenable to any image forming apparatus including color image forming devices.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support, which may be the photosensitive member itself, or other support sheet such as plain paper.

The use of thermal energy for fixing toner images onto a support member is well known and methods include providing the application of heat and pressure substantially concurrently by various means such as, for example, a roll pair maintained in pressure contact, a belt member in pressure contact with a roll, a belt member in pressure contact with a heater, and the like. Heat may be applied by heating one or both of the rolls, plate members, or belt members. With a fixing apparatus using a thin film in pressure contact with a heater, the electric power consumption is small, and the warming-up period is significantly reduced or eliminated.

It is important in the fusing process that minimal or no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquify and a splitting of the molten toner takes place during the fusing operation with a portion remaining on the fuser member. The hot offset temperature or degradation of the hot offset temperature is a measure of the release property of the fuser, and accordingly it is desired to provide a fusing surface, which has a low surface energy to provide the necessary release. To ensure and maintain good release properties of the fuser, it has become customary to apply release agents to the fuser roll during the fusing operation. Typically, these materials are applied as thin films of, for example, silicone oils to prevent toner offset.

Another important method for reducing offset is to impart antistatic and/or field assisted toner transfer properties to the fuser. However, to control the electrical conductivity of the release layer, the conformability and low surface energy properties of the release layer are often affected.

Known fuser coatings include high temperature polymers such as polytetrafluoroethylene, perfluoroalkoxy, fluorinated ethylene propylene, silicone rubber, fluorosilicone rubber, fluoroelastomers, and the like: These coatings have been found to have adequate release properties and control toner offset sufficiently. However, problems have resulted with known fuser member layers, including that the fuser member prematurely hardens resulting in a life short fall. Some known fuser members have also been shown to show a susceptibility to contamination, scratching and other damage. Further, silicone rubber layers tend to swell upon application of release agents. Moreover, fuser members have been shown to provide toner offset or inferior release capability, which allows for inappropriate copies and/or prints, and toner contamination to other parts of the machine.

One of the problems associated with fuser rolls coated with, for example, a fluoroelastomer, is that such coatings have a failure mode where the prints develop noticeable gloss variation as the coating wears. While even the worn areas of a fuser rolls often yield absolute gloss that is within the specification or tolerance limits of an imaging apparatus, a variation of as little as 2 gloss units is detectible by the human eye and may be deemed a failure or unacceptable result.

Extending the wear life of the fuser roll has been achieved in the past by distributing the wear. For example, wear life of the fuser roll has been achieved by moving the paper edge or accessories relative to the rollers, using very low loading force on sensors and fingers in contact with the surfaces, and using retractable members such as stripper fingers.

Additionally, various compositions comprising a polymer and a filler have been used in the production of a fuser component of an imaging member. Among others, these include:

U.S. Pat. No. 5,217,837, the disclosure of which is incorporated herein by reference in its entirety, describes a multi-layered fuser member for fusing thermoplastic resin toner images to a substrate in a fuser system of the type wherein a polymeric release agent having functional groups is applied to the surface of the fuser member. The fuser member includes a base support member, a thermally conductive silicone elastomer layer, an amino silane primer layer, an adhesive layer and an elastomer fusing surface comprising poly (vinylidene fluoride-hexafluoropropylene-tetrafluoroethylene), and a metal oxide present in the fusing surface to interact with the polymeric release agent to provide an interfacial barrier layer between the fusing surface and the toner and substantially unreactive with the elastomer.

U.S. Pat. No. 5,219,612, the disclosure of which is incorporated herein by reference in its entirety, discloses a multi-layered fuser member having a base support member, an adhesive comprising a copolymer of vinylidene fluoride and hexafluoropropylene and at least 20% by weight of the adhesive layer of a coupling agent comprising at least one organo functional silane and an activator, a tie coat layer of active ingredients comprising a copolymer of vinylidene fluoride and hexafluoropropylene and an outer elastermeric fusing surface comprising a copolymer of vinylidene fluoride and hexafluoropropylene and containing a metal oxide present in an amount sufficient to interact with a polymeric release agent having functional groups to provide an interfacial barrier layer between the fusing surface and the toner.

U.S. Pat. No. 5,332,641, the disclosure of which is incorporated herein by reference in its entirety, describes a fuser member having an aluminum base member and an elastomer fusing surface of a poly(vinylidene fluoride-hexafluoropropylene-tetrafluoroethylene) where the vinylidene fluoride is present in an amount of less than 40 mole percent, an adhesive layer between the surface of the aluminum base member and the elastomer fusing surface. The elastomer fusing surface may include metal oxide filler particles.

U.S. Pat. No. 5,595,823 describes a fuser member that includes a core and a layer overlying the core. The layer overlying the core includes a cured fluorocarbon random copolymer with certain fluorinated subunits, and a particulate filler that includes aluminum oxide and a material selected from the group consisting of alkali metal oxides, alkali metal hydroxides, and combinations thereof.

U.S. Pat. No. 5,998,033 describes a fuser member wherein the outermost layer comprises a fluoroelastomer with thermally conductive metal oxide fillers and a silane coupling agent that is interactive with the fluoroelastomer and with an optional release agent.

U.S. Pat. No. 6,011,946, the disclosure of which is incorporated herein by reference in its entirety, is directed to a fuser member having a substrate and a filled polymeric outer layer over the substrate, wherein the filled polymeric outer layer includes a zinc compound disbursed therein. The fuser member also includes a fluid release agent with molecules having amino functionality.

U.S. Pat. No. 6,096,429 is directed to a fuser member having a core and a layer overlying the core wherein the layer overlying the core includes a cured fluorocarbon random copolymer having certain fluorinated subunits. The layer overlying the core incorporates particulate filler that includes zinc oxide, cupric oxide and a material selected from the group consisting of alkali metal oxides, alkali metal hydroxides, and combinations thereof. The filler has a total concentration in the layer of 12% to 75% of the total volume of the layer.

U.S. Pat. No. 6,218,014 describes a fuser member comprising a support and coated thereon a fluorocarbon elastomer layer containing a silicon carbide filler and a cupric oxide filler, and/or a silicon carbide filler treated with a silane coupling agent having a reactive functional group. The fuser member further includes a functionalized polydimethylsiloxane release agent applied to the fluorocarbon elastomer layer in an amount sufficient to produce, upon incubation at elevated temperature, a surface having improved toner release properties on said outermost layer.

U.S. Pat. No. 6,582,871 is directed to a process for fusing toner to paper. The '871 patent describes a fuser member comprising a base, and a fusing surface layer comprising at least one fluoroelastomer and $Fe_2O_3$ filler.

U.S. Pat. Application Publication No. 2004/0023144 discloses a fuser member comprising a core and a pliant coating thereon. The coating comprises a base cushion layer comprised of a first elastomeric composition, with a surface layer thereover comprised of a second elastomeric composition. The surface layer may include a particulate silica filler in an amount of about 10 volume percent or less, based on the total volume of the surface layer.

U.S. Pat. No. 6,829,466, the disclosure of which is incorporated herein by reference in its entirety, describes a fuser component useful in electrostatic graphic machines having an optional substrate, an optional intermediate and/or adhesive layer, and a layer of high temperature plastic such as epoxy, polyketone, polyether, polyamide, and polyparabanic acid. A low surface energy filler, including carbon fillers, metals, metal oxides, doped metal oxides, ceramics, polymer fillers, and nanofillers, may be present in the high temperature plastic layer.

U.S. Pat. No. 6,838,140, the disclosure of which is incorporated herein by reference in its entirety, describes a fuser component having a substrate and a silicon rubber layer over the substrate. The silicon rubber layer has a crosslinked product of at least one platinum catalyzed additional curable vinyl terminated polyorganosiloxane, aluminum oxide fillers, iron oxide fillers, cross linking agent, and an optional outer fluoroelastomer layer.

U.S. Pat. Application Publication No. 2004/0109057, the disclosure of which is incorporated herein by reference in its entirety, describes marking apparatuses and processes for providing a layer on a marking member. The publication application describes a process for providing a layer on a marking member that comprises dissolving a fluoroelastomer, adding and reacting a nano-size zinc oxide as a cross linking agent to form a resulting homogeneous fluoroelastomer dispersion, wherein the nano-size zinc oxide has a particle size of from about 1 to about 250 nanometers, and subsequently providing at least one layer of the homogeneous fluoroelastomer dispersion to the marking member.

U.S. Pat. Application Publication No. 2004/0109055, the disclosure of which is incorporated herein by reference in its entirety, describes an imaging apparatus and layer thereof for use in offsent printing or inkjet printing apparatuses. An imaging member includes an imaging substrate, and thereover an outer coating comprising a nano-size filler having an average particle size of from about 1 to about 250 nanometers.

U.S. Pat. Application Publication No. 2003/0207078, the disclosure of which is incorporated herein by reference in its entirety, describes a fuser member having a polyimide substrate, and thereover an outer layer with from about 61 to about 99 volume percent fluorocarbon. A low surface energy filler and/or electrically conducted filler and/or chemically reactive filler may be present in the fluorocarbon outer layer, including carbon fillers, metals, metal oxides, doped metal oxides, ceramics, polymer fillers, and nanofillers.

U.S. Pat. Application Publication No. 2003/0049056, the disclosure of which is incorporated herein by reference in its entirety, describes a fuser component having a substrate, an optional intermediate and/or adhesive layer, and an outer polyimide layer. The outer polyimide layer may include a filler including carbon fillers, metals, metal oxides, doped metal oxides, ceramics, polymer filters, and nanofillers.

A need remains, however, for fuser components for use in electrostatographic machines that have superior mechanical properties. Further, a need remains for fuser coatings having reduced susceptibility to contamination, scratching, and other damage. In addition, a need remains for a fuser component having a longer life. Even further, a need remains for a fuser component that maintains high gloss even as the surface is worn by media or other hardware within the fuser subsystem.

BRIEF DESCRIPTION

The present disclosure relates, in embodiments thereof, to a fuser member for fixing a developed image to a copy substrate. The fuser member comprises a substrate, and thereover, an outer coating comprising a haloelastomer and filler particles, wherein said filler particles have a particle size of less than about 3 microns and a hardness of at least about 3 on a Mohs' hardness scale.

Moreover, the present disclosure is directed to, in embodiments thereof, a fuser member for fixing a developed image to a copy substrate, comprising a substrate, and thereover, an outer layer comprising a fluoroelastomer and a filler, wherein said filler has a particle size of less than about 0.3 microns and a particle hardness of at least about 3 on a Mohs' hardness scale.

Further aspects of the present disclosure in embodiments thereof include an image forming apparatus performing images on a recording medium comprising a charge-retentive surface to receive an electrostatic latent image thereon; a development component to apply toner to said charge-retentive surface to develop an electrostatic latent image to form a developed image on said charge-retentive surface; a transfer film component to transfer the developed image from said charge-retentive surface to a copy substrate; and a fusing component for fusing toner images to a surface of said copy substrate, said fusing component comprising a substrate, and thereover an outer layer comprising a fluoroelastomer and filler particles, wherein said filler particles have a particle size of less than about 3 microns and a particle hardness of greater than about 3 on a Mohs' hardness scale.

These and other non-limiting characteristics of the development are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
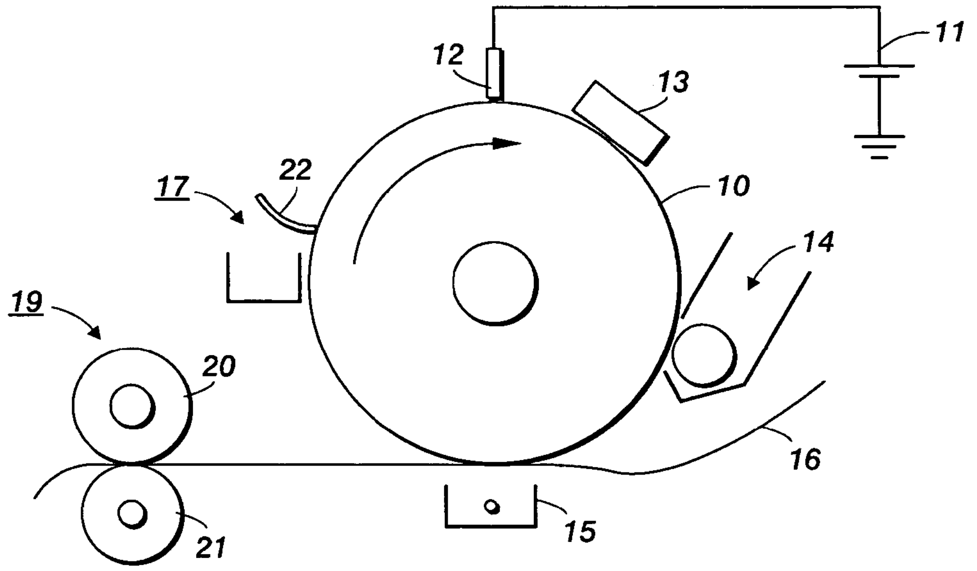
FIG. 1 is an illustration of a general electrostatographic apparatus.

The present disclosure concerns an imaging member or apparatus and fuser components thereof for use in electrostatographic, including digital, contact electrostatic printing, and like apparatuses. The fuser components include a fuser member or roll for fixing a developed image on a copy substrate. The fuser member comprises a substrate and, thereover, an outer coating comprising a haloelastomer and certain filler particles.

A more complete understanding of the components, processes and apparatuses disclosed herein can be obtained by reference to the accompanying drawings. These figures are merely schematic representations based on convenience and the ease of demonstrating the present development, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1 ), brush, or other cleaning apparatus. Although the fusing station 19 depicts the fusing and pressure members as rollers, the fuser and/or pressure member(s) may also be in the form of belts, sheets, films or other like fusing members.

Figure 2:
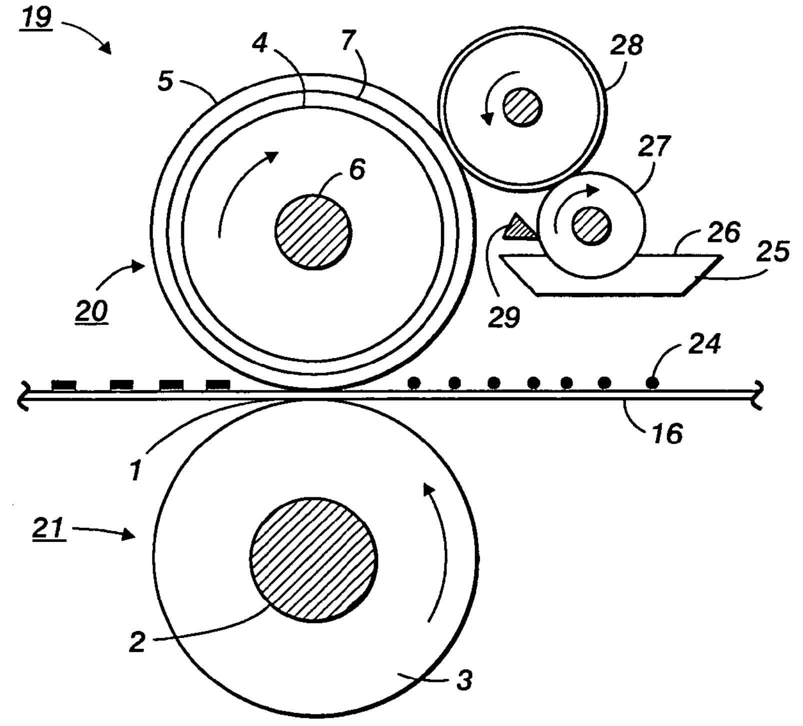
FIG. 2 is a sectional view of a roll fusing system in accordance with an embodiment of the present disclosure.

Referring to FIG. 2, an embodiment of a fusing station 19 is depicted with an embodiment of a fuser roll 20 comprising polymer surface 5 upon a suitable base member 4, a hollow cylinder or core fabricated from any suitable metal, such as aluminum, anodized aluminum, steel, stainless steel nickel, copper, and the like, having a suitable heating element 6 disposed in the hollow portion thereof which is coextensive with the cylinder. The fuser member 20 can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26 that may be a solid or liquid at room temperature, but it is a fluid at operating temperatures. The pressure member 21 may include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicrometer thickness to thicknesses of several micrometers of release fluid. Thus, in embodiments, by metering device 29, from about 0.1 to about 2 micrometers or greater thicknesses of release fluid can be applied to the surface of polymer or elastomer 5.

Figure 3:
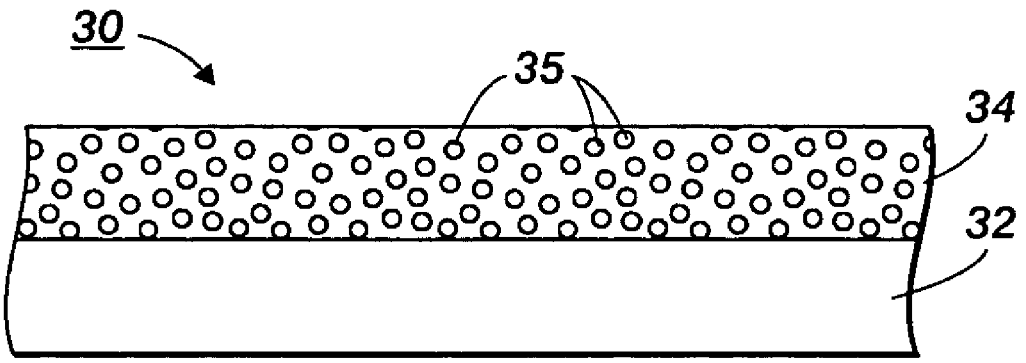
FIG. 3 is a schematic sectional view of a fuser component having a two layer configuration, wherein the outer layer comprises a high gloss coating in accordance with the present disclosure.

With reference to FIG. 3, an embodiment of a fusing component is shown. FIG. 3 depicts a fusing component 30 having a two layer configuration and comprising a substrate 32 and an outer layer 34 positioned over the substrate. Outer layer 34 comprises a haloelastomer such as, for example, a fluoroelastomer, and a filler, such as filler particles 35, dispersed or contained therein.

Figure 4:
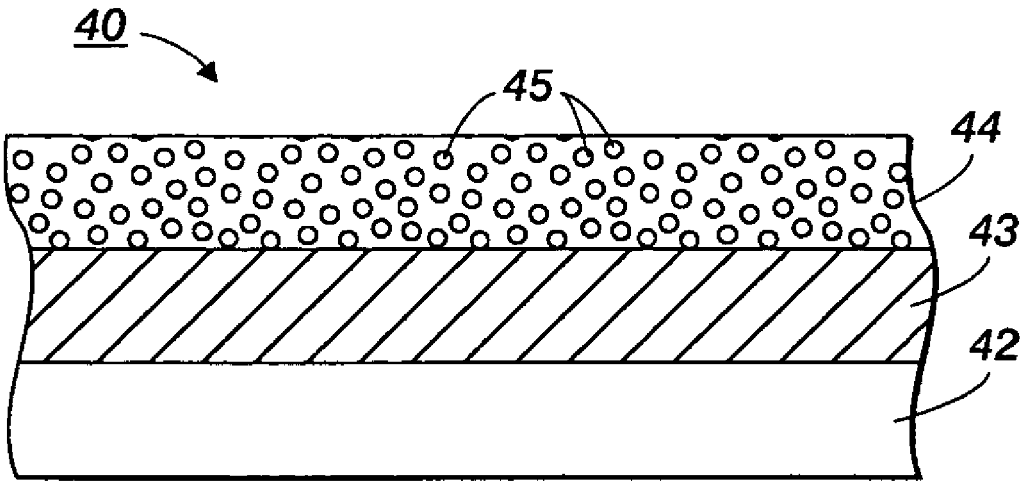
FIG. 4 is a schematic cross sectional view of a fuser component having a three layer configuration, wherein the outer layer comprises a high gloss composition in accordance with the present disclosure.

With reference to FIG. 4, a fuser component 40 having a three layer configuration is shown. Fuser component 40 includes substrate 42 outer layer 44, and intermediate layer 43 disposed between substrate layer 42 and outer layer 44. Outer layer 44 comprises a coating composition in accordance with the present disclosure, which comprises a haloelastomer, such as a fluoroelastomer, and a filler, such as filler particles 45, disbursed or contained therein.

While the fuser components depicted in FIGS. 3 and 4 are shown as fuser belts, the fuser component in accordance with the present disclosure can be of any suitable configuration. For example, a fuser component may be in the form of sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like.

It will be further appreciated by those skilled in the art that a fuser component in accordance with the present disclosure is not limited to two layer and/or three layer configurations. A fuser component in accordance with the present disclosure may include, as desired, any number of intermediate layers and/or adhesive layers disposed between a substrate and an outer layer.

Examples of suitable substrate materials include in the case of roller or film-type substrates, metals such as aluminum, stainless steel, steel, nickel and the like. In the case of film-type substrates, suitable substrates include high temperature plastics that are suitable for allowing a high operating temperature (i.e., greater than about 80° C., preferably greater than 200° C.), and capable of exhibiting high mechanical strength. In embodiments, the plastic has a flexural strength of from about 2,000,000 to about 3,000,000 psi, and a flexural modulus of from about 25,000 to about 55,000 psi. Plastics possessing the above characteristics and which are suitable for use as the substrate for the fuser members include epoxy; polyphenylene sulfide such as that sold under the tradenames FORTRON® available from Hoechst Celanese, RYTON R-4® available from Phillips Petroleum, and SUPEC® available from General Electric; polyimides such as polyamide-imide sold under the tradename TORLON® 7130 available from Amoco; polyketones such as those sold under the tradename KADEL® E1230 available from Amoco, polyether ether ketone sold under the tradename PEEK 450GL30 from Victrex, polyaryletherketone, and the like; polyamides such as polyphthalamide sold under the tradename AMODEL® available from Amoco; polyethers such as polyethersulfone, polyetherimide, polyaryletherketone, and the like; polyparabanic acid, and the like; liquid crystalline resin (XYDAR®) available from Amoco; ULTEM® available from General Electric; ULTRAPEK® available from BASF; and the like, and mixtures thereof. Other suitable substrate materials include fluoroelastomers such as those sold under the tradename VITON® from DuPont; silicone rubbers, and other elastomeric materials. The substrate may also comprise a mixture of any of the above materials. In embodiments, the substrate comprises aluminum.

The substrate as a film, sheet, belt, or the like, may have a thickness of from about 25 to about 250, or from about 60 to about 100 micrometers. However, when utilized in roll form, the thickness is range from about 0.175 to about 25, including from about 1.2 to about 15.

The outer layer comprises a coating composition comprising a haloelastomer, such as, for example, a fluoroelastomer, and a filler having a particle size of less than about 3 microns and a particle hardness of greater than about 3 on the Mohs' hardness scale.

In embodiments, the outer layer comprises an elastomer, such as a haloelastomer. Examples of elastomers comprising halogen monomers include chloroelastomers, fluoroelastomers and the like. Examples of fluoroelastomers include, but are not limited to, ethylenically unsaturated fluoroelastomers, and fluoroelastomers comprising copolymers and terpolymers of vinylidenefluoride, hexafluoropropylene and tetrafluoroethylene, which are known commercially under various designations as VITON A®, VITON B®, VITON E®, VITON F®, VITON E60C®, VITON E45®, VITON E430®, VITON B 910®, VITON GH®, VITON B50®, VITON E45®, and VITON GF®. The VITON® designation is a Trademark of E.I. DuPont de Nemours, Inc. Three known fluoroelastomers are (1) a class of copolymers of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer, for example, VITON GF®, VITON A®, and VITON B®.

In another embodiment, the fluoroelastomer is a tetrapolymer having a relatively low quantity of vinylidenefluoride. An example is VITON GF®, available from E.I. DuPont de Nemours, Inc. The VITON GF® has 35 weight percent of vinylidenefluoride, 34 weight percent of hexafluoropropylene and 29 weight percent of tetrafluoroethylene with 2 weight percent cure site monomer. The cure site monomer can be those available from DuPont such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomer.

Other suitable fluoroelastomers include, but are not limited to, AFLAS®, FLUOREL® I, FLUOREL® II, TECHNOFLON® and the like commercially available elastomers.

The outer layer coating composition comprises filler particles having a particle size of less than about 3 micrometers and a particle hardness of at least about 3 on a Mohs' hardness scale. In embodiments, the filler has a particle size of less than about 1 micrometer. In another embodiment, the filler has a particle size of less than about 0.5 micrometers. In still another embodiment, the filler has a particle size in the range of from about 0.001 to about 3 micrometers. In still a further embodiment, the filler has a particle size in the range of from about 0.001 to about 0.03 micrometers. As used herein, particle size refers to the size of any characteristic dimension of a filler particle based on the shape of the filler particle(s). For example, the particle size may be given in terms of the diameter of substantially spherical particles or nominal diameter for irregular shaped particles. Further, the shape of the filler particles is not limited in any manner.

Examples of suitable filler particles include, but are not limited to, silica, alumina, boron nitride, aluminum nitride, boron carbide, silicon carbides, tungsten carbide, aluminum oxide, anitase titanium dioxide, zinc oxide, rutile titanium dioxide, and the like.

The filler is present in the outer layer coating composition in an amount of 2 to about 30 volume percent of total solids.

The outer layer may comprise more than one type of filler particle. Further, the outer layer may comprise filler particles of varying sizes, shapes, and/or particle hardness, provided that the filler particles have a particle size of less than about 3 microns and a particle hardness of at least about 3 on a Mohs' hardness scale.

Without being bound to any particular theory, a fuser comprising an outer layer that includes a haloelastomer, such as a fluoroelastomer, and a filler wherein the filler has a particle size of less than about 3 microns and a particle hardness of at least about 3 on the Mohs' hardness scale exhibits high gloss even as the fuser is worn. As the fuser is worn, the surface remains at a relatively high gloss, and the difference in surface texture between worn and unworn surface areas will be relatively small such that the delta gloss failure modes can be reduced or, in some instances, eliminated. Thus, the use of such outer layers effectively extends the life of the fuser components. Further, the gloss of the worn areas is impacted by particle size, particle hardness and filler concentration. Gloss may, therefore, be adjusted by varying the particle size, type of particle and/or particle hardness, and/or filler concentration to match the gloss of the roll surface.

The coating compositions comprising the haloelastomer and filler particles in accordance with the present disclosure may be prepared by milling the fluoroelastomer together with the filler(s), oxides and curative on a roll mill. The material may then be molded or extruded onto the roll/belt. Alternately, the compounded material may be milled on a roll mill and dissolved in a suitable solvent such as MEK, MIBK acetone or the like. Alternately, portions of the material are milled on a roll mill and others may be added directly to the solvent. The "dissolved" material is then coated onto the component by spraying, dipping, ring coating or flow coating In embodiments, the thickness of the outer layer is from about 5 to about 250 microns. In other embodiments, the thickness of the outer layer is from about 8 to about 150 microns. In still other embodiments, the thickness of the outer layer is from about 15 to about 80 microns.

In an optional embodiment, an intermediate layer may be positioned between the imaging substrate and the outer layer. Materials suitable for use in the intermediate layer include silicone materials, elastomers such as fluoroelastomers, fluorosilicones, ethylene propylene diene rubbers, silicone rubbers such as fluorosilicones, phenyl silicones, silicone blends, and the like. Additional polymers useful as the outer release layer include fluoropolymers such as polytetrafluoroethylene (PTFE), fluorinated ethylenepropylene copolymer (FEP), polyfluoroalkoxy polytetrafluoroethylene (PFA Teflon), ethylene chlorotrifluoro ethylene (ECTFE), ethylene tetrafluoroethylene (ETFE), polytetrafluoroethylene perfluoromethylvinylether copolymer (MFA), and the like. These polymers, together with adhesives, can also be included as intermediate layers and the like, and mixtures thereof. In embodiments, the intermediate layer is conformable and is of a thickness of from about 0.1 to about 10 mm, or from about 0.25 to about 9 mm.

Examples of suitable adhesives include silanes such as amino silanes (such as, for example, A1100 from OSI Specialties, Friendly, W. Va.), titanates, zirconates, aluminates, and the like, and mixtures thereof. In an embodiment, an adhesive in from about 0.25 to about 10 percent solution can be wiped on the substrate. The adhesive layer can be coated on the substrate, or on the high temperature plastic layer, to a thickness of from about 2 to about 2,000 nanometers, or from about 2 to about 500 nanometers. The adhesive can be coated by any suitable, known technique, including spray coating or wiping.

The substrate and optional intermediate layer(s) may also include fillers dispersed therein. The fillers in the substrate and/or optional intermediate layer(s) are not critical and not limited in any manner, and not limited in terms of particle size or hardness. It will be appreciated, however, that the substrate and/or optional intermediate layer(s) may include filler particles having a particle size of less than about 3 microns and a particle hardness of at least about 3 on the Mohs' hardness scale. Examples of suitable fillers for the substrate and/or optional intermediate layer(s) includes those described in U.S. Pat. No. 6,829,466, the entire disclosure of which is incorporated herein by reference.

The following examples are for purposes of further illustrating fuser components in accordance with the present disclosure. The examples are merely illustrative and are not intended to limit fuser components in accordance with the disclosure to the materials, conditions, or process parameters set forth therein. All parts are percentages by volume unless otherwise indicated.

EXAMPLES

Preparation of the Samples

A base coating was prepared as follows: the following ingredients were milled together on a roll mill:

| | |
|---|---|
| Viton GF | 100 parts (Dow-DuPont) |
| Filler | Per Table 1 |
| Ca(OH)2 | 6 parts |
| MagO | 3 parts |
| VC50 | 5 parts (Dow DuPont) |
| Silane | 1 part |

The compounded material was then molded in a heated press in ASTM rubber pads at 350F. The pads were demolded and subject to a 18 hour post cure.

Fillers were added to the base compositions to prepare the final coating composition. The fillers and amounts thereof utilized in the coating compositions are shown in TABLE 1.

Gloss Measurements of Coating Compositions.

Pad sections were abraded to evaluate the gloss of the coating layer.

The pads were abraded as follows. The pads were heated to 200° C.+/−7° C. 33 m of 4024 paper was moved under an 8.73 mm indenter ball for 5 minutes. A load of 150 g was placed on the indenter ball. The gloss of the resultant wear scale was then evaluated. The wear scar was too small for conventional gloss measurements. Therefore, a subjective scale of 1 to 5 was used, with 1 being a low gloss and 5 being a high gloss. The results are shown in TABLE 1.

TABLE 1

| Sample | Filler | Particle Size (mm) | Particle Hardness (Mohs') | Filler Concentration (Vol. %) | Gloss Rating |
|---|---|---|---|---|---|
| 1 | None | — | — | — | 1-2 |
| 2 | SiC (46 pph) | 3 | 9.15 | 18 | 1 |
| 3 | SiC (46 pph) | <0.3 | 9.15 | 18 | 5 |
| 4 | N990 (39 pph) | 0.25-0.35 | 2-2.29 | 28 | 3 |
| 5 | ZnO (72 pph) | 0.12-0.3 | 4 | 19 | 4-5 |
| 6 | ZnO (110 pph) | 0.12-0.3 | 4 | 26 | 5 |

As shown in TABLE 1, a fluoroelastomer coating comprising filler particles with a particle size of less than about 3 mm and a Mohs' hardness of greater than about 3 provides improved gloss and appearance in worn areas.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A fuser member, for fixing a developed image to a copy substrate, comprising:

a substrate;

an outer layer comprising a fluoroelastomer and a first filler, wherein said first filler has a particle size of 0.3 microns or less;

wherein the first filler is selected from the group consisting of boron carbide, tungsten carbide, and combinations thereof; and wherein the fluoroelastomer is a tetrapolymer of vinylidenefluoride, hexafluoropropylene, tetrafluoroethylene, and a cure site monomer; and an intermediate layer located between the substrate and the outer layer, the intermediate layer comprising a fluoropolymer, an adhesive, and a second filler, the second filler having a particle size of 0.3 microns or less and being selected from the group consisting of boron carbide, tungsten carbide, and combinations thereof.

2. The fuser member according to claim 1, wherein said first filler has a particle size in the range of from about 0.00 1 to 0.3 microns.

3. The fuser member according to claim 1, wherein said first filler has a particle size of from about 0.1 to 0.3 microns.

4. The fuser member according to claim 1, wherein said first filler is present in an amount of from about 2 to about 30 percent by volume of said outer layer.

5. An image forming apparatus for forming images on a recording medium comprising:

a charge-retentive surface to receive an electrostatic latent image thereon;

a development component to apply toner to said charge-retentive surface to develop an electrostatic latent image to form a developed image on said charge-retentive surface;

a transfer film component to transfer the developed image from said charge-retentive surface to a copy substrate; and a fusing component for fusing toner images to a surface of said copy substrate, said fusing component comprising:

a substrate;

an outer layer comprising a fluoroelastomer and filler particles, wherein said filler particles have a particle size of 0.3 microns or less and the filler particles are selected from the group consisting of boron carbide, tungsten carbide, and combinations thereof; and the fluoroelastomer is a tetrapolymer of vinylidenefluoride, hexafluoropropylene, tetrafluoroethylene, and a cure site monomer; and an intermediate layer located between the substrate and the outer layer, the intermediate layer comprising a fluoropolymer, an adhesive, and a second filler, the second filler having a particle size of 0.3 microns or less and being selected from the group consisting of boron carbide, tungsten carbide, and combinations thereof.

6. The image forming apparatus according to claim 5, wherein said filler particles are present in an amount of from about2to about 30 volume % of said outer layer.

* * * * *